(12) United States Patent
Hwang et al.

(10) Patent No.: US 11,985,591 B2
(45) Date of Patent: May 14, 2024

(54) METHOD FOR TRANSMITTING AND RECEIVING DOWNLINK DATA AND APPARATUS THEREFOR

(71) Applicant: LG ELECTRONICS INC., Seoul (KR)

(72) Inventors: Daesung Hwang, Seoul (KR); Inkwon Seo, Seoul (KR); Changhwan Park, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 497 days.

(21) Appl. No.: 17/278,260

(22) PCT Filed: Sep. 20, 2019

(86) PCT No.: PCT/KR2019/012225
§ 371 (c)(1),
(2) Date: Mar. 19, 2021

(87) PCT Pub. No.: WO2020/060281
PCT Pub. Date: Mar. 26, 2020

(65) Prior Publication Data
US 2021/0360523 A1   Nov. 18, 2021

(30) Foreign Application Priority Data

Sep. 21, 2018  (KR) .................. 10-2018-0114371

(51) Int. Cl.
*H04W 52/02*     (2009.01)
*H04W 72/0446*   (2023.01)
*H04W 72/23*     (2023.01)

(52) U.S. Cl.
CPC ... *H04W 52/0216* (2013.01); *H04W 72/0446* (2013.01); *H04W 72/23* (2023.01)

(58) Field of Classification Search
CPC ......... H04W 52/0216; H04W 72/0446; H04W 72/23; H04W 52/02; H04W 72/12;
(Continued)

(56) References Cited

U.S. PATENT DOCUMENTS 10,292,202 B2 * 5/2019 Loehr et al. .......... H04W 76/28
10,306,611 B2 * 5/2019 Lee et al. ............ H04W 72/042
(Continued)

FOREIGN PATENT DOCUMENTS

EP   3661093 B1 * 11/2014 ............ H04W 72/00
EP   3397000 A1 * 10/2018 ............ H04W 28/06
(Continued)

OTHER PUBLICATIONS

Marinier et al.: Wireless Transmit/Receive Unit and Method Performed Thereby; TW I753859 B. (Year: 2022).*
Park et al.: Method and Device for Allocating Data Channel Resource for Next-Generation Wireless Access Network; WO 2018080268 A1. (Year: 2018).*
(Continued)

*Primary Examiner* — Meless N Zewdu
(74) *Attorney, Agent, or Firm* — LEE, HONG, DEGERMAN, KANG & WAIMEY

(57) ABSTRACT

A method by which a terminal receives downlink data in a wireless communication system is disclosed. Particularly, the method comprises: receiving information related to downlink data transmitted during a specific time period; receiving downlink control information (DCI) on the basis of the information related to the downlink data; and receiving the downlink data on the basis of the DCI.

5 Claims, 17 Drawing Sheets

(58) Field of Classification Search
CPC ..... H04W 72/14; H04W 48/00; H04W 48/12; H04W 52/143; H04W 72/1273; H04W 74/00; H04W 74/006; H04W 72/232; H04W 72/20; H04L 5/0044; H04L 5/0053; H04L 5/0091; H04L 5/00; H04L 25/03955; H04L 5/001; H04L 5/0035; H04L 5/0094; Y02D 30/70; H04B 7/024
See application file for complete search history.

(56) References Cited

U.S. PATENT DOCUMENTS

| | | | | |
|---|---|---|---|---|
| 10,958,384 | B2* | 3/2021 | Hwang et al. | H04L 1/1819 |
| 2011/0083066 | A1* | 4/2011 | Chung et al. | 714/807 |
| 2015/0256306 | A1* | 9/2015 | Kim et al. | H04L 5/0035 |
| 2015/0365831 | A1* | 12/2015 | Ko et al. | H04W 16/26 |
| 2016/0330780 | A1* | 11/2016 | Kim et al. | H04W 76/023 |
| 2017/0339723 | A1 | 11/2017 | Fujishiro et al. | |
| 2018/0206290 | A1* | 6/2018 | Dai | H04W 76/28 |
| 2019/0246378 | A1* | 8/2019 | Islam et al. | H04W 72/042 |
| 2019/0356459 | A1* | 11/2019 | Wang et al. | H04L 5/0082 |
| 2019/0387508 | A1* | 12/2019 | Park et al. | H04W 72/042 |

FOREIGN PATENT DOCUMENTS

| | | |
|---|---|---|
| KR | 20140037189 | 3/2014 |
| WO | 2012134219 | 10/2012 |

OTHER PUBLICATIONS

Yoichiro et al.: Automatic Driving Vehicle, Anti-Theft System of Automatic Driving Vehicle, Anti-Theft Program of Automatic Driving Vehicle, Terminal Control Program, and Rental Method of Automatic Driving Vehicle; WO 2015056530 A1. (Year: 2015).*
Park et al.: Method for Transmitting and Receiving Data Channel for New Radio and Apparatuses Thereof; KR 20180048371 A. (Year: 2018).*
Wang et al.: A Downlink Data Channel for Confirming the Initial Position of the Method and Device; CN 108282880 A. (Year: 2018).*
CN 108476433 A) >>> receiving unit, receiving downlink control information for scheduling the received downlink data, and a control unit, a transmission time interval (TTI): Transmission Time Interval) as unit, distributing the receiving interval of said downlink control information (see abstract). (Year: 2018).*
KR 20160126009 A) >>> In various embodiments, the processing of the downlink data may be based on scheduling and / or control information (e.g., the downlink data may be received at the instance indicated in the scheduling and / or control information). (see "Operation 740" in the description). (Year: 2016).*
PCT International Application No. PCT/KR2019/012225, International Search Report dated Jan. 16, 2020, 16 pages.
Caict, "Considerations on PDCCH enhancements to support URLLC," 3GPP TSG RAN WG1 Meeting #94, R1-1809288, Aug. 2018, 4 pages.
NEC, "Enhancements to PDCCH," 3GPP TSG RAN WG1 Meeting #94, R1-1808617, Aug. 2018, 2 pages.

* cited by examiner

FIG. 1
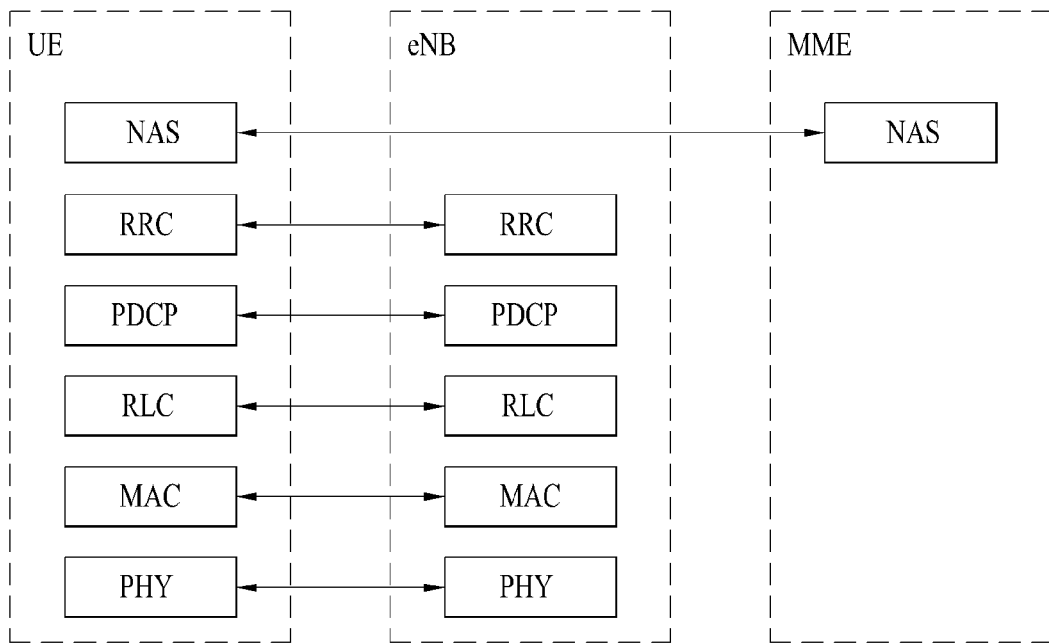
(A) CONTROL-PLANE PROTOCOL STACK
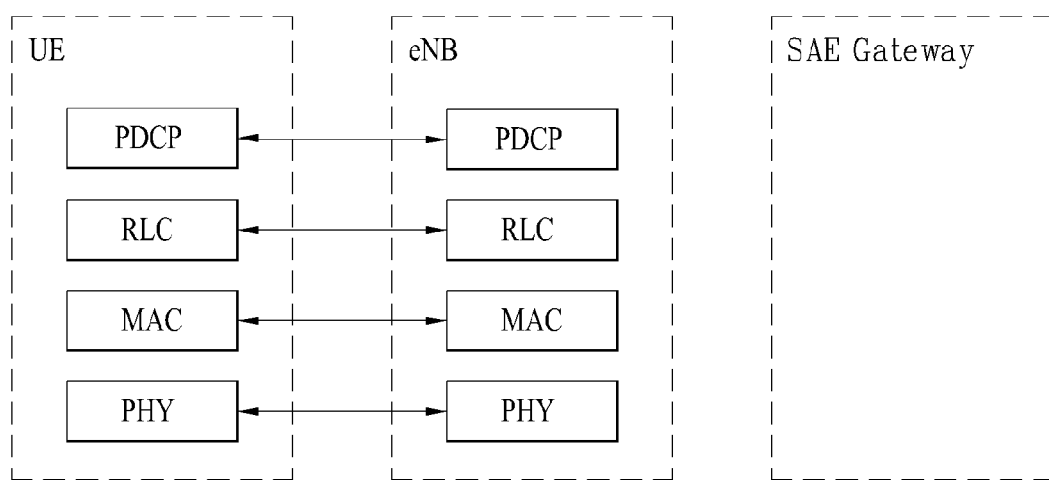
(B) USER-PLANE PROTOCOL STACK Block interleaver

1000(102/106,202/206)

METHOD FOR TRANSMITTING AND RECEIVING DOWNLINK DATA AND APPARATUS THEREFOR

CROSS-REFERENCE TO RELATED APPLICATIONS

This application is the National Stage filing under 35 U.S.C. 371 of International Application No. PCT/KR2019/012225, filed on Sep. 20, 2019, which claims the benefit of earlier filing date and right of priority to Korean Application No. 10-2018-0114371, filed on Sep. 21, 2018, the contents of which are all incorporated by reference herein in their entirety.

TECHNICAL FIELD

The present disclosure relates to a method for transmitting and receiving downlink data and an apparatus therefor, and more particularly, to a method for transmitting and receiving a downlink data channel capable of saving power of a terminal, and an apparatus therefor.

BACKGROUND ART

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

An object of the present disclosure is to provide a method for transmitting and receiving downlink data and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, a method for receiving downlink data by a user equipment (UE) in a wireless communication system may include receiving information related to the downlink data transmitted during a specific time duration, receiving downlink control information (DCI) based on the information related to the downlink data, and receiving the downlink data based on the DCI.

The information related to the downlink data may be information on an amount of the downlink data transmitted during the specific time duration, wherein the receiving of the DCI may be receiving the DCI until downlink data corresponding to the amount of the downlink data is received.

The information related to the downlink data may be information on a number of transport blocks (TBs) transmitted during the specific time duration, wherein the receiving of the DCI may be receiving the DCI until TBs corresponding to the number of TBs are received.

The information related to the downlink data may be information on a number of downlink control channels transmitted during the specific time duration, wherein the receiving of the DCI may be receiving the DCI until downlink control channel corresponding to the number of downlink control channels is received.

The information related to the downlink data may be information related to a starting point and length of the specific time duration, wherein the receiving of the DCI may be receiving the DCI based on the starting point and length of the specific time duration.

The UE is capable of communicating with at least one of anther UE, a network, a base station, or an autonomous driving vehicle.

In another aspect of the present disclosure, an apparatus for receiving downlink data in a wireless communication system may include at least one processor, and at least one memory operatively connected to the at least one processor and configured to store instructions causing the at least one processor to perform an operation when executed, wherein the operation may include receiving information related to the downlink data transmitted during a specific time duration, receiving downlink control information (DCI) based on the information related to the downlink data, and receiving the downlink data based on the DCI.

The information related to the downlink data may be information on an amount of the downlink data transmitted during the specific time duration, wherein the receiving of the DCI may be receiving the DCI until downlink data corresponding to the amount of the downlink data is received.

The information related to the downlink data may be information on a number of transport blocks (TBs) transmitted during the specific time duration, wherein the receiving of the DCI may be receiving the DCI until TBs corresponding to the number of TBs are received.

The information related to the downlink data may be information on a number of downlink control channels transmitted during the specific time duration, wherein the receiving of the DCI may be receiving the DCI until downlink control channel corresponding to the number of downlink control channels is received.

The information related to the downlink data may be information related to a starting point and length of the specific time duration, wherein the receiving of the DCI may be receiving the DCI based on the starting point and length of the specific time duration.

The apparatus may be capable of communicating with at least one of a user equipment (UE), a network, a base station, or an autonomous driving vehicle.

In another aspect of the present disclosure, a user equipment (UE) for receiving downlink data in a wireless communication system may include at least one transceiver, at least one processor, and at least one memory operatively connected to the at least one processor and configured to store instructions causing the at least one processor to perform an operation when executed, wherein the operation may include receiving information related to the downlink data transmitted during a specific time duration via the at least one transceiver, receiving downlink control information (DCI) based on the information related to the downlink data via the at least one transceiver, receiving the downlink data based on the DCI via the at least one transceiver.

Advantageous Effects

According to the present disclosure, power consumption of a terminal may be optimized in transmitting and receiving downlink data.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

FIG. 1 is a diagram illustrating the control-plane and user-plane architecture of radio interface protocols between a user equipment (UE) and an evolved UMTS terrestrial radio access network (E-UTRAN) in conformance to a 3rd generation partnership project (3GPP) radio access network standard.

BEST MODE

Figure 2:
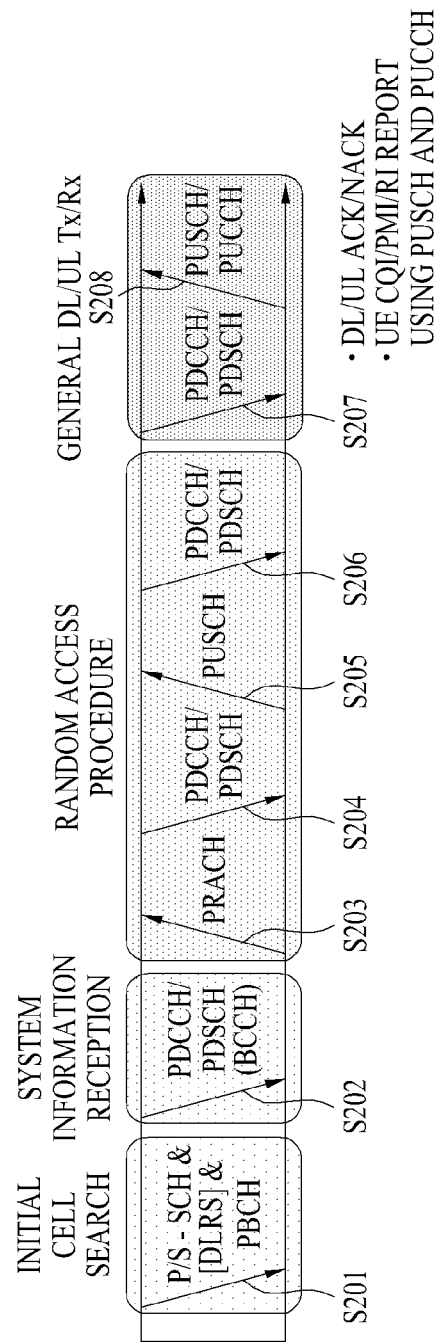
FIG. 2 is a diagram illustrating physical channels and a general signal transmission method using the physical channels in a 3GPP system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a $3^{rd}$ generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure (S206).

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

The use of an ultra-high frequency band, that is, a millimeter frequency band at or above 6 GHz is under consideration in the NR system to transmit data in a wide frequency band, while maintaining a high transmission rate for multiple users. In 3GPP, this system is called NR. In the present disclosure, the system will be referred to as an NR system.

In addition, the NR system uses an OFDM transmission scheme or a transmission scheme similar thereto. The NR system may conform to OFDM parameters different from the OFDM parameters of LTE. Alternatively, the NR system may conform to the existing LTE/LTE-A neurology, but may have a larger system bandwidth (e.g., 100 MHz). Alternatively, one cell may support a plurality of neurologies. In other words, UEs operating in different neurologies may coexist within one cell.

Figure 3:
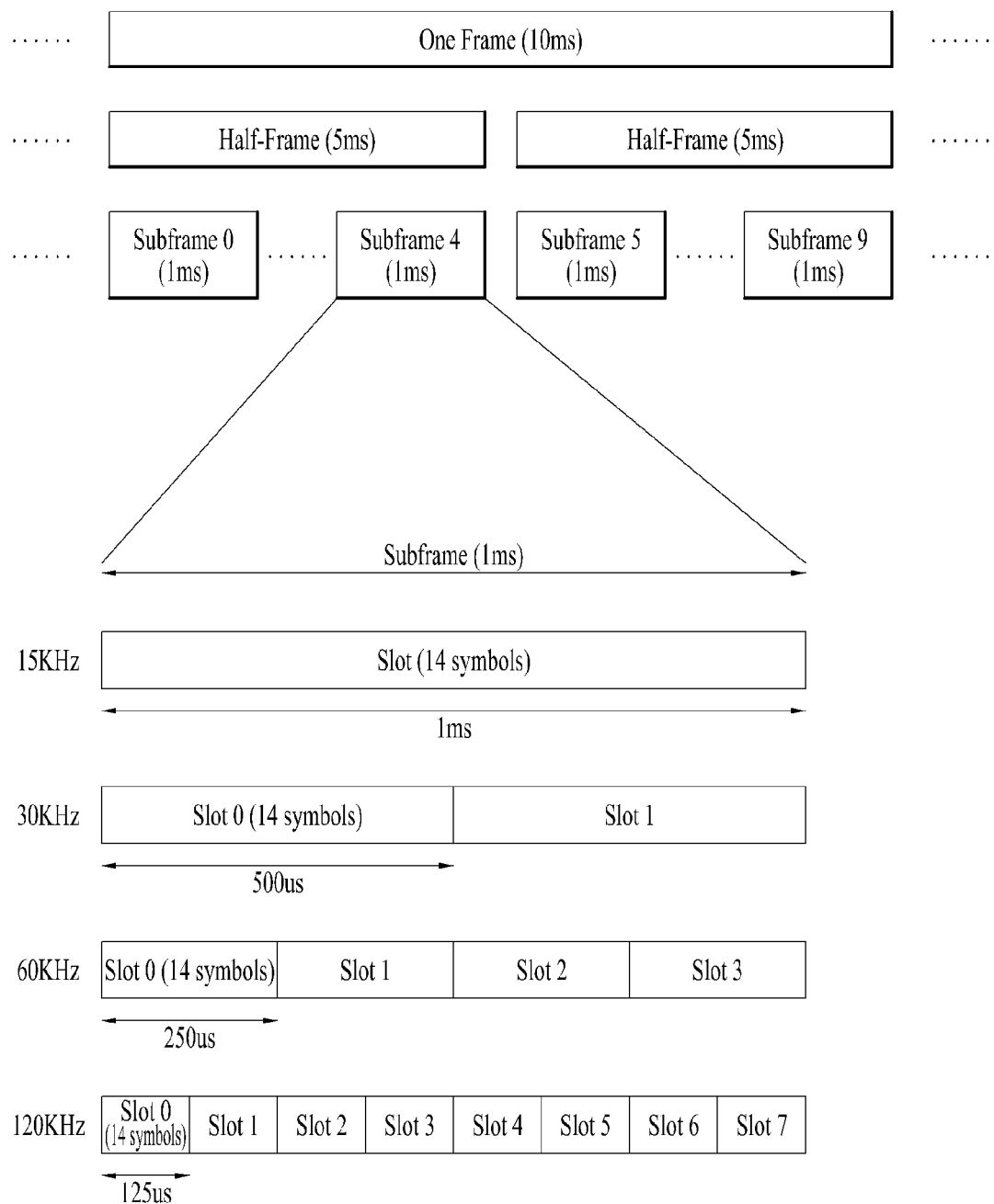
FIGS. 3 to 5 are diagrams illustrating structures of a radio frame and slots used in a new RAT (NR) system.

FIG. 3 illustrates a structure of a radio frame used in NR.

In NR, UL and DL transmissions are configured in frames. The radio frame has a length of 10 ms and is defined as two 5-ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

Table 1 illustrates that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame, u}_{slot}$: Number of slots in a frame
*$N^{subframe, u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells.

Figure 4:
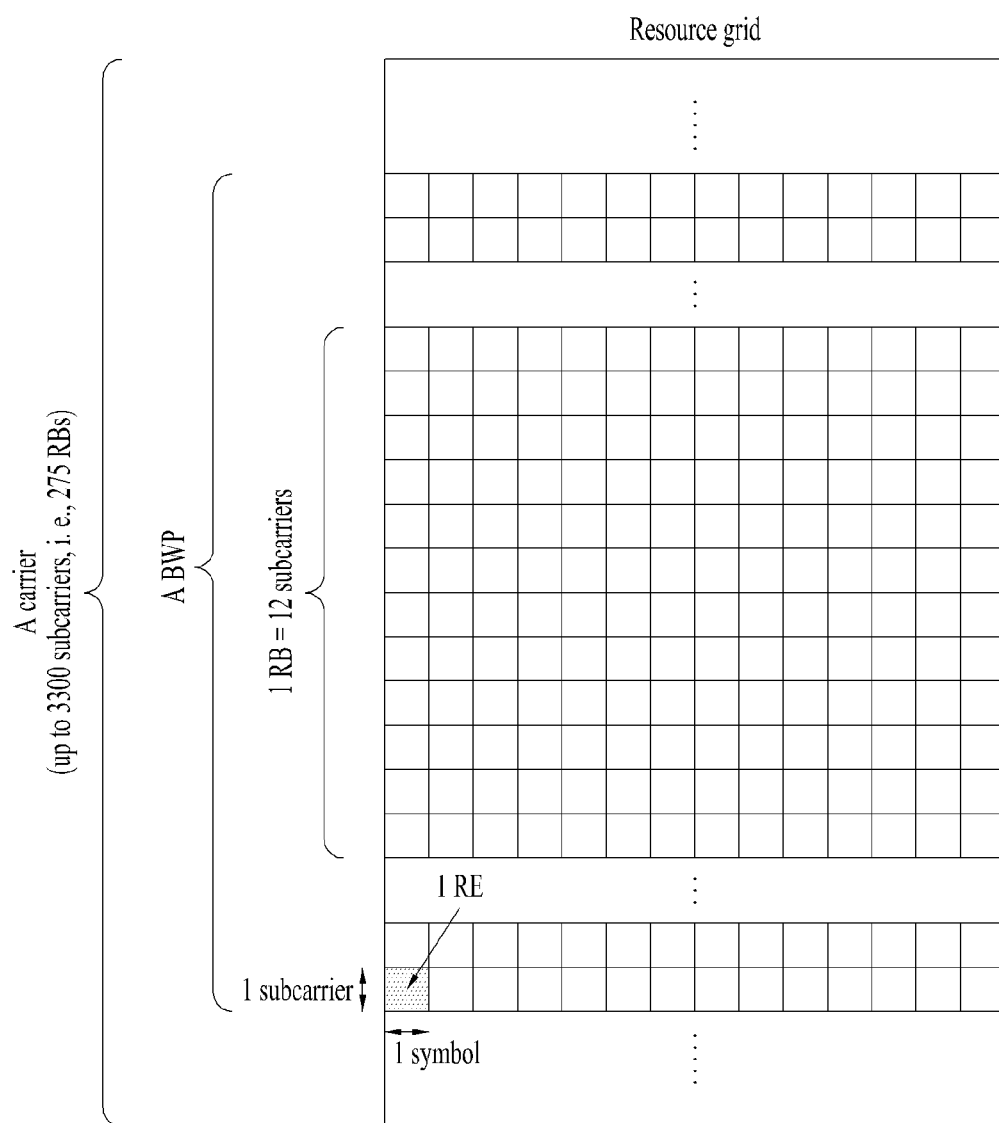

FIG. 4 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 5:
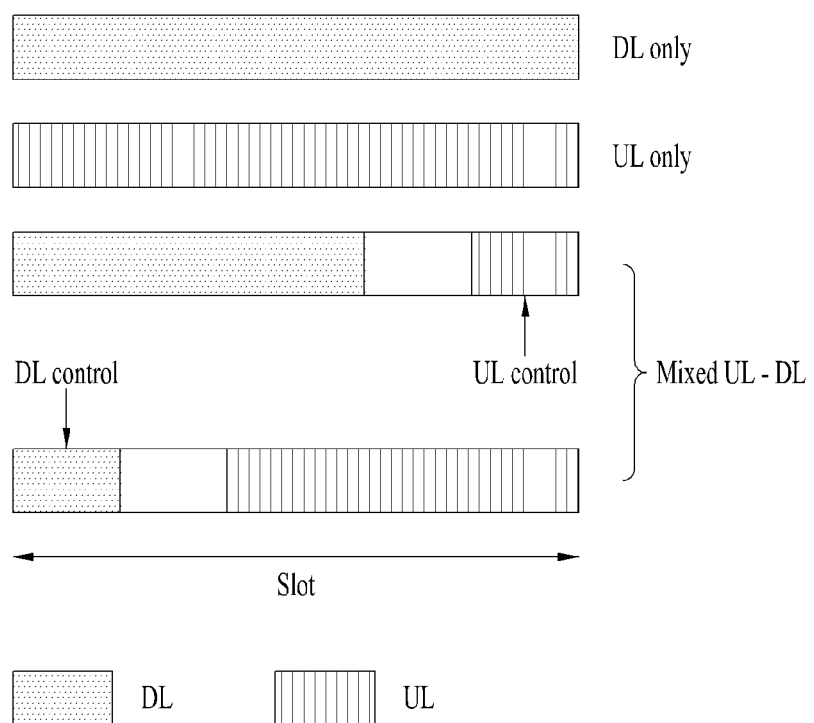

FIG. 5 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
      DL region: (i) DL data region, (ii) DL control region+ DL data region
      UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

DL Channel Structures

An eNB transmits related signals on later-described DL channels to a UE, and the UE receives the related signals on the DL channels from the eNB.

(1) Physical Downlink Shared Channel (PDSCH)

The PDSCH carries DL data (e.g., a DL-shared channel transport block (DL-SCH TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

(2) Physical Downlink Control Channel (PDCCH)

The PDCCH carries DCI and adopts QPSK as a modulation scheme. One PDCCH includes 1, 2, 4, 8, or 16 control channel elements (CCEs) according to its aggregation level (AL). One CCE includes 6 resource element groups (REGs), each REG being defined by one OFDM symbol by one (physical) resource block ((P)RB)).

Figure 6:
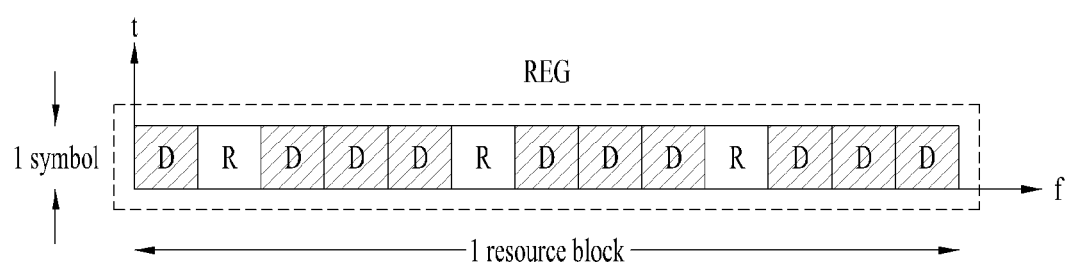
FIGS. 6 to 8 are diagrams illustrating a physical downlink control channel (PDCCH) in the NR system.

FIG. 6 illustrates an exemplary structure of one REG. In FIG. 6, D represents an RE to which DCI is mapped, and R represents an RE to which a DMRS is mapped. The DMRS is mapped to RE #1, RE #5, and RE #9 along the frequency direction in one symbol.

The PDCCH is transmitted in a control resource set (CORESET). A CORESET is defined as a set of REGs with a given numerology (e.g., an SCS, a CP length, or the like). A plurality of CORESETs for one UE may overlap with each other in the time/frequency domain. A CORESET may be configured by system information (e.g., a master information block (MIB)) or UE-specific higher-layer signaling (e.g., RRC signaling). Specifically, the number of RBs and the number of symbols (3 at maximum) in the CORESET may be configured by higher-layer signaling.

For each CORESET, a precoder granularity in the frequency domain is set to one of the followings by higher-layer signaling:

sameAsREG-bundle: It equals to an REG bundle size in the frequency domain.

allContiguousRBs: It equals to the number of contiguous RBs in the frequency domain within the CORESET.

The REGs of the CORESET are numbered in a time-first mapping manner. That is, the REGs are sequentially numbered in an ascending order, starting from 0 for the first OFDM symbol of the lowest-numbered RB in the CORESET.

Figure 7:
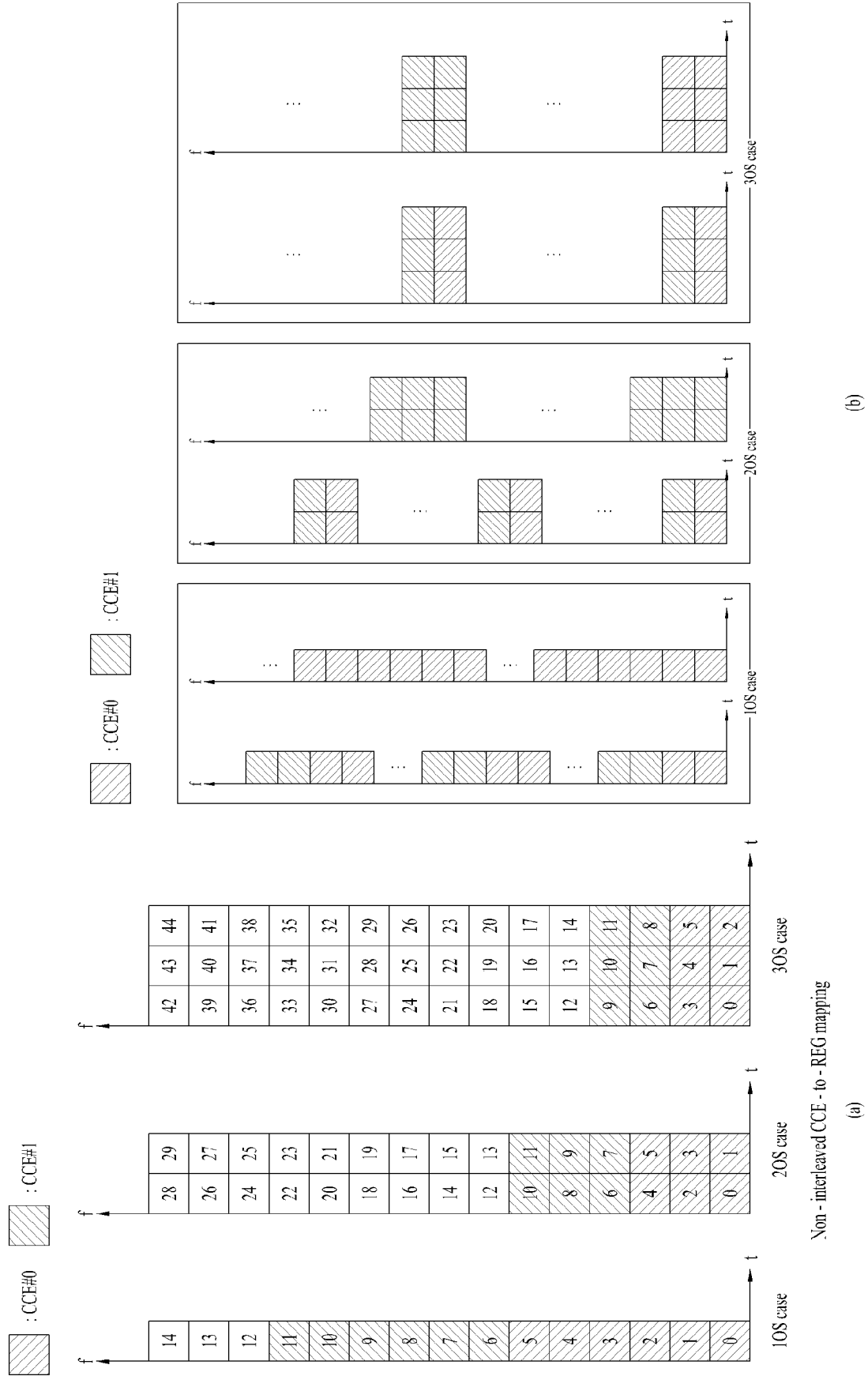

CCE-to-REG mapping for the CORESET may be an interleaved type or a non-interleaved type. FIG. 7(a) is an exemplary view illustrating non-interleaved CCE-REG mapping, and FIG. 7(b) is an exemplary view illustrating interleaved CCE-REG mapping.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved in the CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

Figure 8:
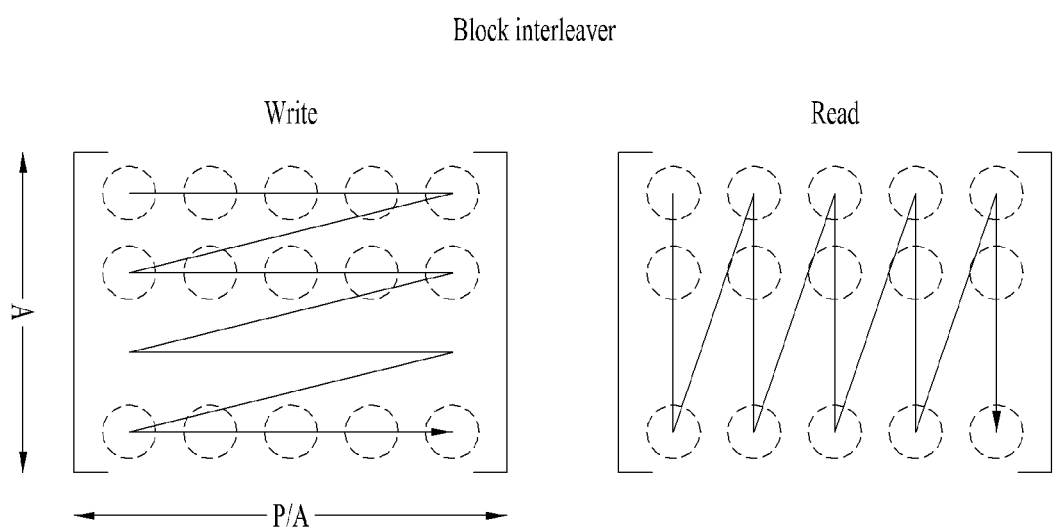
Figure 12:
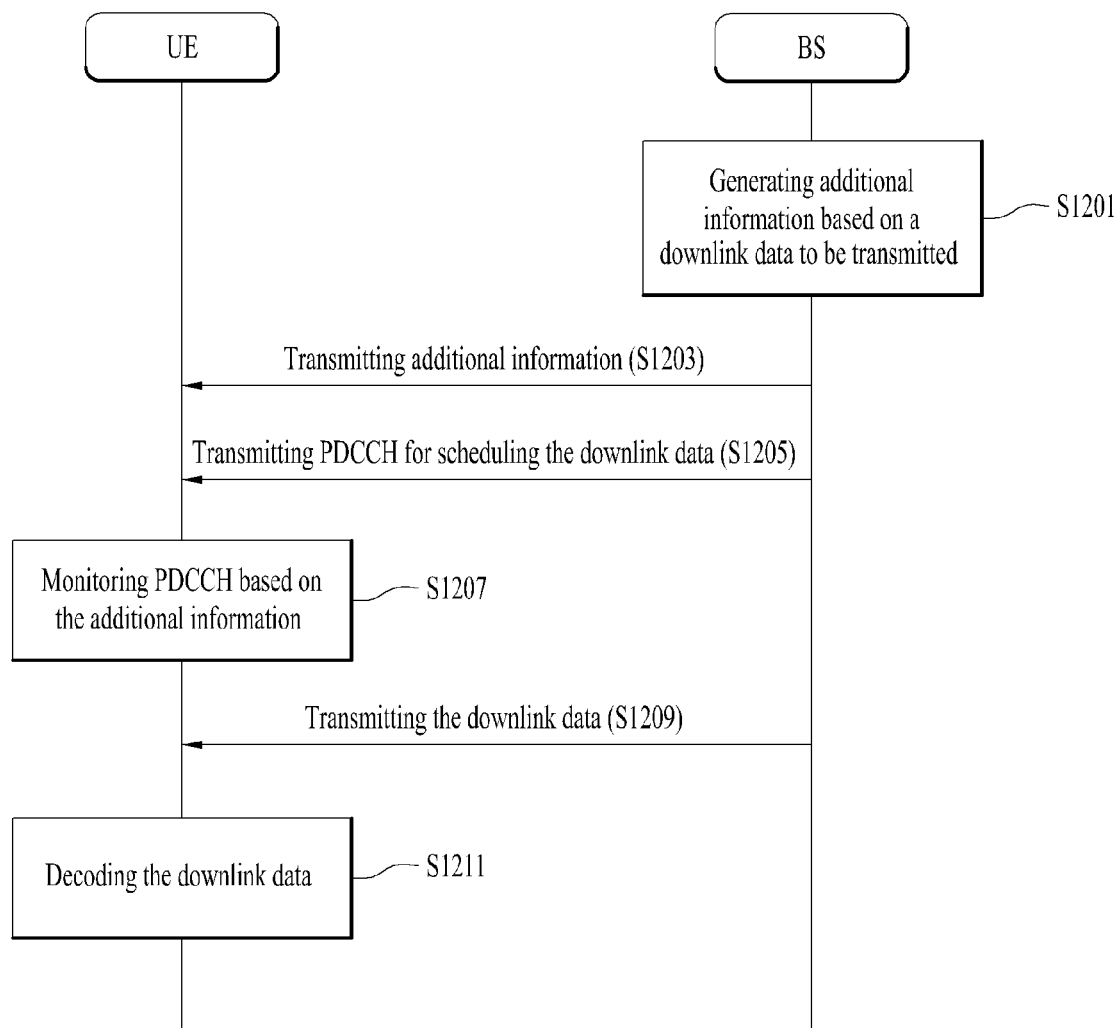

FIG. 8 illustrates an exemplary block interleaver. For the above interleaving operation, the number A of rows in a (block) interleaver is set to one or 2, 3, and 6. When the number of interleaving units for a given CORESET is P, the number of columns in the block interleaver is P/A. In the block interleaver, a write operation is performed in a row-first direction, and a read operation is performed in a column-first direction, as illustrated in FIG. 12. Cyclic shift (CS) of an interleaving unit is applied based on an ID which is configurable independently of a configurable ID for the DMRS.

The UE acquires DCI delivered on a PDCCH by decoding (so-called blind decoding) a set of PDCCH candidates. A set of PDCCH candidates decoded by a UE are defined as a PDCCH search space set. A search space set may be a common search space or a UE-specific search space. The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.

controlResourceSetId: A set of control resources related to the search space set.

monitoringSlotPeriodicityAndOffset: A PDCCH monitoring periodicity (in slots) and a PDCCH monitoring offset (in slots).

monitoringSymbolsWithinSlot: A PDCCH monitoring pattern (e.g., the first symbol(s) in the CORESET) in a PDCCH monitoring slot.

nrofCandidates: The number of PDCCH candidates (one of 0, 1, 2, 3, 4, 5, 6, and 8) for each AL={1, 2, 4, 8, 16}.

Table 3 lists exemplary features of the respective search space types.

TABLE 3

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 lists exemplary DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

UL Channel Structures

A UE transmits a related signal to the BS on a UL channel, which will be described later, and the BS receives the related signal from the UE through the UL channel to be described later.

(1) Physical Uplink Shared Channel (PUSCH)

The PUSCH carries UL data (e.g., UL-shared channel transport block (UL-SCH TB)) and/or UL control information (UCI), and is transmitted based a Cyclic Prefix-Orthogonal Frequency Division Multiplexing (CP-OFDM) waveform or a Discrete Fourier Transform-spread-Orthogonal Frequency Division Multiplexing (DFT-s-OFDM) waveform. When the PUSCH is transmitted based on the DFT-s-OFDM waveform, the UE transmits the PUSCH by applying transform precoding. For example, when transform precoding is not allowed (e.g., transform precoding is disabled), the UE may transmit the PUSCH based on the CP-OFDM waveform. When transform precoding is allowed (e.g., transform precoding is enabled), the UE may transmit the PUSCH based on the CP-OFDM waveform or the DFT-s-OFDM waveform. PUSCH transmission may be dynamically scheduled by the UL grant in the DCI or may be semi-statically scheduled based on higher layer (e.g., RRC) signaling (and/or Layer 1 (L1) signaling (e.g., PDCCH)) (configured grant). PUSCH transmission may be performed on a codebook basis or a non-codebook basis.

(2) Physical Uplink Control Channel (PUCCH)

The PUCCH carries UCI, HARQ-ACK and/or scheduling request (SR), and is divided into a short PUCCH and a long PUCCH according to the PUCCH transmission length. Table 5 exemplarily shows PUCCH formats.

TABLE 5

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HAR, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

Multiplexing of Short PUCCH and Long PUCCH

Figure 9:
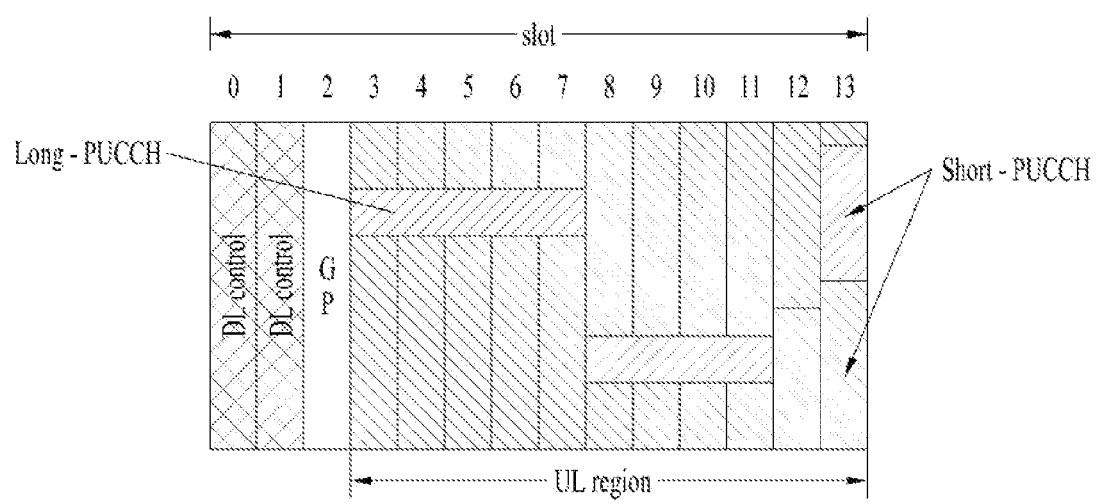
FIG. 9 is a diagram illustrating multiplexing of a long physical uplink control channel (long PUCCH) and a short PUCCH in an NR system.

FIG. 9 illustrates a configuration in which the short PUCCH and the long PUCCH are multiplexed with a UL signal.

The PUCCH (e.g., PUCCH format 0/2) and PUSCH may be multiplexed in a TDM or FDM scheme. A short PUCCH and a long PUCCH from different UEs may be multiplexed in the TDM or FDM scheme. Short PUCCHs from a single UE in one slot may be multiplexed in the TDM scheme. A short PUCCH and a long PUCCH from a single UE in one slot may be multiplexed in the TDM or FDM scheme.

Bandwidth Part (BWP)

The NR system may support up to 400 MHz per carrier. If a UE operating in such a wideband carrier always keeps a radio frequency (RF) module on for the whole carrier, the UE may suffer from great battery consumption. Considering multiple use cases (e.g., eMBB, URLLC, mMTC, V2X, etc.) in one wideband carrier, different numerologies (e.g., sub-carrier spacings) may be supported for different frequency bands of the carrier. Each UE may have a different capability regarding a maximum bandwidth. In this regard, an eNB may indicate a UE to operate only in a part of the bandwidth of the wideband carrier, not across the total bandwidth. Such a partial bandwidth is referred to as a BWP. A BWP is a subset of contiguous common resource blocks defined for numerology $\mu_i$ in BWP i in the frequency domain, and one numerology (e.g., subcarrier spacing, CP length, or slot/mini-slot duration) may be configured for the BWP.

The gNB may configure one or more BWPs in one carrier configured for the UE. If UEs are concentrated in a specific BWP, some UEs may be switched to another BWP, for load balancing. For frequency-domain inter-cell interference cancellation between adjacent cells, BWPs at both ends of the total bandwidth of a cell except for some center spectrum may be configured in the same slot. That is, the gNB may configure at least one DL/UL BWP for the UE associated with the wideband carrier, activate at least one of DL/UL BWP(s) configured at a specific time (by L1 signaling which is a physical-layer control signal, a MAC control element (CE) which is a MAC-layer control signal, or RRC signaling), indicate the UE to switch to another configured DL/UL BWP (by L1 signaling, a MAC CE, or RRC signaling), or set a timer value and switch the UE to a predetermined DL/UL BWP upon expiration of the timer value. To indicate switching to another configured DL/UL BWP, DCI format 1_1 or DCI format 0_1 may be used. Particularly, an activated DL/UL BWP is referred to as an active DL/UL BWP. During initial access or before RRC connection setup, the UE may not receive a DL/UL BWP configuration. A DL/UL BWP that the UE assumes in this situation is referred to as an initial active DL/UL BWP.

A DL BWP is a BWP used to transmit and receive a DL signal such as a PDCCH and/or a PDSCH, and a UL BWP is a BWP used to transmit and receive a UL signal such as a PUCCH and/or a PUSCH.

In the New RAT (NR) system, the temporal position for PDCCH monitoring may differ between a configuration for a control resource set (CORESET) and a configuration for a search space. One or more CORESETs and/or search spaces may be configured for the UE, and the UE may monitor the PDCCH at a slot position and/or a symbol position indicated in each configuration.

However, depending on the traffic characteristics such as the packet arrival rate and/or the latency requirement, continuing to perform PDCCH blind decoding at the time when PDCCH monitoring is configured to be performed may be inefficient in terms of the complexity of the UE and power consumption of the UE. For example, when a packet size for the BS to schedule for the UE is fixed, it may be inefficient for the UE to expect that a transport block (TB) or PDSCH larger than the packet size will be scheduled.

Accordingly, in the present disclosure, operations of the UE according to traffic conditions or traffic information are proposed. In addition, in order to assist the operation of the UE, a method of configuring and transmitting additional information that may be transmitted by a BS to the UE is proposed.

In the present disclosure, for simplicity, a description will be made focusing on a PDCCH monitoring method, but the present disclosure may be extended to other UE operations such as measurement/reporting. In addition, while an embodiment of an operation performed by the UE based on additional information received from the BS is described in the present disclosure, the present disclosure is applicable even to a case where the BS receives additional information from the UE and operates based thereon. In addition, the proposed method described in an embodiment of the present disclosure and methods that may be configured the method may be implemented by an apparatus. The present disclosure also includes a description of the apparatus implementing the proposed method.

Figure 10:
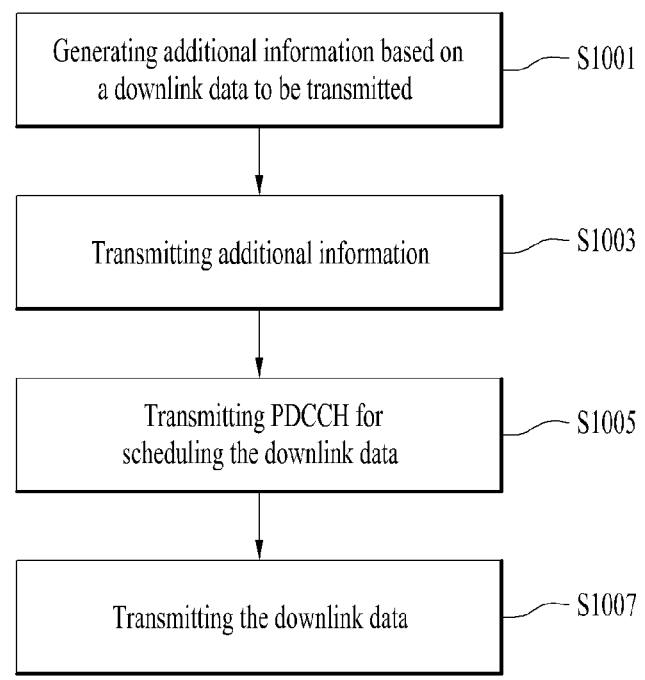
FIGS. 10 to 12 illustrate an example of operation implementation of a UE, a base station (BS), and a network according to an embodiment of the present disclosure.
Figure 11:
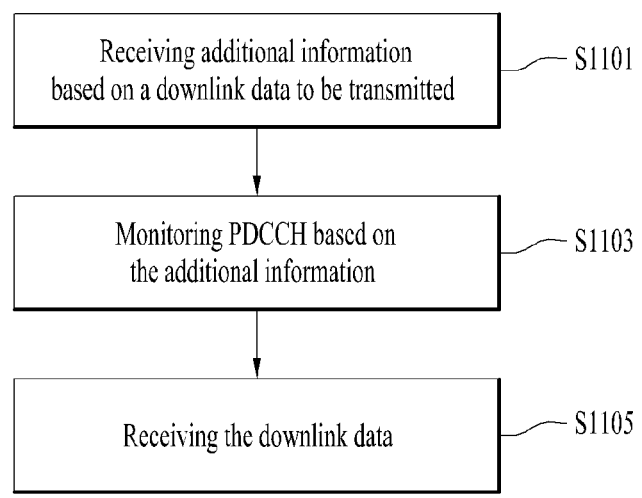

FIGS. 10 to 12 illustrate an example of operation implementation of a BS, a UE, and a network according to an embodiment of the present disclosure.

An example of an operation implementation of a BS according to an embodiment of the present disclosure will be described with reference to FIG. 10. Referring to FIG. 10, the BS may generate additional information based on the amount and/or characteristics of downlink data to be transmitted to the UE (S1001). The BS may transmit the generated additional information to the UE (S1003). Here, the generated additional information and a method for transmitting the additional information to the UE may be based on Embodiments 1 and 2, which will be described later. A physical downlink control channel (PDCCH) for scheduling of the downlink data may be transmitted (S1005). In addition, the downlink data may be transmitted to the UE based on the scheduling information included in the PDCCH (S1007). In this operation, the BS may transmit the PDCCH and the downlink data to the UE based on the additional information. A specific transmission method and operation procedure may be based on Embodiments 1 and 2, which will be described later.

Each step in FIG. 10 may be performed by the processor of the BS. Specifically, operations of the BS according to Embodiments 1 and 2 may be performed by the processor of the BS corresponding to FIGS. 14 to 17. In addition, physical signals related to each step based on Embodiments 1 and 2 may be transmitted and received by the transceiver of the BS under control of the processor. In other words, control information, data, and the like transmitted on the PDCCH and PDSCH may be processed by the processor of the BS. In addition, for transmission and reception of physical layer signals, the processor may include the elements shown in FIGS. 14 to 17.

FIG. 11 illustrates an example of implementation of operation of a UE according to an embodiment of the present disclosure. Referring to FIG. 11, the UE may receive, from the BS, additional information for reception of downlink data (S1101). Here, the received additional information may be generated based on the amount and/or characteristics of downlink data to be transmitted by the BS, and specific details of the additional information may be determined based on Embodiments 1 and 2, which will be described later.

The UE may monitor the PDCCH based on the additional information (S1103) and receive downlink data scheduled by the PDCCH (S1105). In this case, a specific operation of the UE of receiving the downlink data may be performed based on Embodiments 1 and 2.

In this case, each step in FIG. 11 may be performed based on Embodiments 1 and 2. Each step in FIG. 11 may be performed by the processor of the UE. Specifically, the operation of the UE according to Embodiments 1 and 2 may be performed by the processor of the UE corresponding to FIGS. 14 to 17. In addition, physical signals related to each step based on Embodiments 1 and 2 may be transmitted and received by the transceiver of the UE under control of the processor. In other words, control information, data, and the like transmitted on the PDCCH and PDSCH may be processed by the processor of the UE. In addition, for transmission and reception of physical layer signals, the processor may include the elements shown in FIGS. 14 to 17.

FIG. 12 illustrates an example of implementing of operation of a network according to an embodiment of the present disclosure.

Referring to FIG. 12, the BS may generate additional information based on the amount and/or characteristics of downlink data to be transmitted to the UE (S1201), and transmit the additional information to the UE (S1203). Here, the generated additional information and a method for transmitting the additional information to the UE may be based on Embodiments 1 and 2, which will be described later. A physical downlink control channel (PDCCH) for scheduling the downlink data may be transmitted (S1205). The UE may monitor the PDCCH based on the received additional information (S1207). In addition, the UE may receive downlink data based on the additional information and scheduling information of the PDCCH (S1209), and decode the received downlink data (S1211). In this case, a specific method for the UE to monitor the PDCCH and receive and decode downlink data may be based on Embodiments 1 and 2.

Each step in FIG. 12 may be performed by the processors of the UE and the BS. Specifically, operations of the UE and the BS according to Embodiments 1 and 2 may be performed by the processors of the UE and the BS corresponding to FIGS. 14 to 17. In addition, physical signals related to each step based on Embodiments 1 and 2 may be transmitted and received by the transceivers of the UE and the BS under control of the processors. In other words, control information, data, and the like transmitted on the PDCCH and PDSCH may be processed by the processors of the UE and the BS. In addition, for transmission and reception of physical layer signals, the processors may include the elements shown in FIGS. 14 to 17.

Embodiment 1: Additional Information Transmitted from a BS for Assistance of UE Operation When the BS schedules DCI for a UL grant for the UE in the NR system, the BS may receive, from the UE, information about the amount of UL resources required by the UE or the amount of UL data to be transmitted by the UE, such as buffer status reporting (BSR). In addition, the BS may allocate and transmit DCI for a UL grant indicating an appropriate amount of UL data and an appropriate UL resource allocation based on the information transmitted by the UE, such as BSR.

On the other hand, in the case of DL data, the BS may allocate and transmit DCI for DL assignment to the UE without scheduling the amount of DL data to be received by the UE, and the UE may receive the DCI for DL assignment and decode the PDSCH based thereon.

However, in the NR system, it is necessary to efficiently perform PDCCH monitoring in order to save power efficiently. For example, PDCCH monitoring may be performed differently according to the amount of DL data received by the UE or characteristics of the DL data. Therefore, embodiments of the present disclosure propose that the BS provide information on DL data to the UE for power saving operation of the UE. Specific embodiments of additional information about a packet (e.g., DL data) that the BS may provide to the UE are disclosed below.

Embodiment 1-1(a)

The BS may transmit the amount of DL data to be transmitted by the BS to the UE during a specific time period that is predefined or configured by a higher layer for a UE or a UE group. For example, the BS may transmit the number of bits corresponding to the amount of DL data to be transmitted or a metric value corresponding thereto to the UE.

In addition, the BS may transmit information about the packet size or information about the sum of TB sizes to be scheduled by the BS to the UE. Here, the TB size may be a size excluding cyclic redundancy check (CRC), or may be a size including the TB CRC and/or CB CRC, and the BS may transmit information in a proper form according to UE implementation.

The UE may monitor the PDCCH for all or part of the CORESET and/or search space until it receives all the packet size or the sum of the TB sizes to be scheduled included in the information transmitted by the BS. In other words, when all the packet size or the sum of the TB sizes to be scheduled included in the information transmitted by the BS are received, the PDCCH monitoring for all or part of the CORESET and/or the search space may be stopped.

Embodiment 1-1(b)

The BS may provide the number of TBs for the BS to transmit to the UE during a specific time period predefined or configured by a higher layer for the UE or the UE group. For example, the PDSCH may include one or more TBs (e.g., two TBs) according to scheduling information, and the BS may transmit information on the total number of TBs to be transmitted on one or more PDSCHs to the UE.

The UE may monitor the PDCCH for all or part of the CORESET and/or search space until TBs corresponding to the set total number of TBs are received. In other words, when all TBs as many as the total number of TBs are received, PDCCH monitoring for all or part of the CORESET and/or search space may be stopped.

Embodiment 1-1(c)

The BS may transmit information on the number of PDCCHs and/or PDSCHs that the BS will transmit to the UE during a specific time period preconfigured or configured through a higher layer for a UE or a UE group. For example, the number of PDCCHs may be represented as the number of short DRX cycles, the number of long DRX cycles, or the number of PDCCH monitoring occasions. In addition, the BS may transmit, to the UE, information on the COREST, search space and/or DCI format in which PDCCH monitoring is performed. In this case, the corresponding PDCCH may be limited to PDCCHs including DCI for scheduling the PDSCH. In addition, the PDCCHs and/or PDSCH may correspond to unicast data or may be limited to a case where data scrambling and/or CRC masking is determined by the UE ID. Here, the case where CRC masking is determined by the UE ID may be a case where CRC masking is performed by C-RNTI, CS-RNTI, or MCS-C-RNTI.

In addition, the BS may transmit information on the number of PDCCHs to the UE based on the type and purpose of the DCI such as PDSCH scheduling, PUSCH scheduling, dynamic Slot Format Indicator (SFI), interruption information, or transmission power control (TPC).

Until the UE receives the PDCCHs and/or PDSCHs corresponding to the number of PDCCHs and/or PDSCHs included in the information received from the BS, it may monitor the PDCCHs in all or part of the CORESET and/or search space. In other words, when all PDCCHs and/or PDSCHs corresponding to the number of PDCCHs and/or PDSCHs are received, PDCCH monitoring for all or part of the CORESET and/or search space may be stopped.

Embodiment 1-1(d)

The BS may transmit, to a corresponding UE or UE group, information on an active duration T for which data may be received. In this case, when the DRX operation is configured, the active duration may be shorter than or equal to an active time duration by the DRX timer.

This active duration may be determined according to the amount of data for the UE or UE group, a channel condition of the UE, a network load and/or a scheduling status. In addition, for the value of the active duration, a subset of candidate values that may be indicated among various candidate values may be separately configured through radio resource control (RRC), and one of the values included in the subset may be indicated.

In addition, the BS may transmit information on a scheduling pattern or the like to the UE or the UE group. The scheduling pattern may be determined according to a scheduling status of the network and a traffic rate. In addition, in order to determine the control channel monitoring behavior of the UE, the BS may transmit a value for the blocking probability of the network to the UE. For example, when the blocking probability of the network is low, the UE may monitor PDCCHs based on the minimum aggregation level set and/or the minimum number of PDCCH candidates. On the other hand, when the blocking probability of the network is high, the scheduling flexibility of the network may be increased by increasing the aggregation level set and the number of PDCCH candidates.

In Embodiments 1-1(a) to 1-1(d), the BS may transmit packet information about a PDSCH scheduled based on DCI and packet information about a PDSCH corresponding to DL semi-persistent scheduling (SPS) to the UE independently. In this case, a release signal for the DL SPS may not be received.

In addition, the BS may transmit only additional information about a packet of the PDSCH scheduled based on DCI to the UE. This is because the DL SPS may be a packet for Voice over Internet Protocol (VoIP), and thus individually managing multiple packets may be useful in terms of network resource management or TB management of the UE.

While scheduling a specific packet for a specific UE or before completing the scheduling, the BS may additionally schedule a new packet or there may be a change in the amount of the packet being transmitted. In this case, the BS may provide additional information about the updated packet to the UE again, or may transmit, to the UE, additional information about the details of the change of the additional information about the packet, for example, information about reduction/increase/maintenance of the packet. In addition, the UE may determine a PDCCH monitoring method based on the additional information about the packet updated or transmitted by the BS. The BS may transmit a specific signal or channel such that the UE continues PDCCH monitoring for all or part of the CORESET and/or search space.

Even when the PDCCH monitoring needs to be stopped, PDCCH monitoring at a specific point in time for receiving a broadcast message may be limitedly performed. For example, PDCCH monitoring for fallback DCI such as DCI format 1-0/0-0 in a specific common search space (CSS) may still be performed. The PDCCH monitoring at a specific point in time for receiving the broadcast message may be intended for PDCCH CRC masking and/or PDSCH data scrambling to monitor a PDCCH based on the SI-RNTI, P-RNTI, RA-RNTI, or TC-RNTI. In addition, the above-described operation may be applied in the same or similar manner to a method of changing UE operation according to a load of an integrated access backhaul (IAB) node associated with a relay, such as the IAB.

In this case, the UE may receive the PDSCH through a single serving cell, or may receive the PDSCH through a plurality of serving cells by carrier aggregation (CA). Accordingly, the above-described additional information about the packet may be a value for all serving cells. The BS may transmit the additional information to the UE, or may transmit additional information about the packet for each serving cell or each serving cell group to the UE.

The additional information about the packet provided by the BS to the UE in Embodiments 1-1(a) to 1-1(d) may be transmitted as follows.

Embodiment 1-2(a)

It may be transmitted on a PDCCH including DCI. For example, the DCI may have the same size as the fallback DCI such as DCI format 1-0, or the payload size of the DCI may be configured through a higher layer. In addition, the CRC of the DCI may be masked with a third RNTI.

In addition, information on packets related to a plurality of UEs may be multiplexed in the DCI. In this case, information about mapping between the respective UEs and information about a packet may be preconfigured through higher layer signaling, and the UE may monitor the PDCCH based on information about the respective packets corresponding to the UEs.

In addition, the CORESET and/or the search space through which DCI is transmitted may be configured through a higher layer. Periodicity of the CORESET and/or the search space through which DCI is transmitted may also be configured in units of one or more slots, symbols, or symbol groups. Alternatively, an additional field or reserved states of a specific field may be used in the scheduling DCI. For example, the BS may indicate whether the corresponding PDSCH is for the last packet through the scheduling DCI.

Embodiment 1-2(b)

It may be transmitted to the UE through a part of paging information such as a paging record. For example, the paging information may carry additional information about a packet of the UE together with information about the identity of the UE to the UE. The paging information may be distinguished from the existing paging information. For example, the paging information including the additional information about the packet may be defined as an extended paging record. In this case, the existing paging record and the extended paging record may be distinguished by a paging occasion or may be distinguished based on PDCCH CRC masking and/or PDSCH data scrambling through a separate eP-RNTI.

Embodiment 1-2(c)

Additional information about a packet may be transmitted to the UE through a medium access control (MAC) message. The MAC message may be transmitted on the PDSCH, and CRC masking and/or PDSCH data scrambling of the PDCCH corresponding to the MAC message of the UE may be distinguished through a UE ID such as C-RNTI, CS-RNTI or MCS-C-RNTI. Here, the MAC message may be included in another MAC message or may be transmitted together with another MAC message simultaneously. For example, the MAC message may be included in a TCI update MAC message.

Embodiment 1-2(d)

Packet information up to the next wake-up signal transmission may be transmitted through a wake-up signal, or the wake-up signal may contain the packet information when necessary. Alternatively, the packet information may be used as a wake-up signal. For example, when the UE receives a wake-up signal in an active state, it may be assumed that the wake-up signal contains additional information about the packet or assistance information such as additional information.

When the wake-up signal is transmitted for the purpose of wake-up, additional information and/or additional information about the packet may be transmitted together to determine whether to monitor the control channel of the UE. Here, the wake-up signal may be replaced with a go-to-sleep signal, and in this case, information further restricting PDCCH monitoring of the UE may be transmitted together.

The wake-up signal is a signal indicating whether the UE actually performs an operation for PDCCH monitoring for the active time corresponding to the wake-up signal. When the wake-up signal is not received, the UE may not perform the PDCCH monitoring operation.

In addition, when a go-to-sleep signal is received, the UE may not perform the PDCCH monitoring operation for the active time.

Embodiment 2: UE Operation Based on Additional Information Received from a BS

In Embodiment 2, specific embodiments of PDCCH monitoring based on the additional information about the packet provided by the BS described in Embodiment 1 will be described.

Embodiment 2-1(a)

In Embodiment 2-1(a), a specific PDCCH monitoring method according to Embodiment 1-1(a) will be described.

According to Embodiment 1-1(a), when the UE receives information on a packet size or the sum of the TB sizes to be scheduled, the value included in the information may be stored in a separate storage space. When the UE successfully receives/decodes a TB corresponding to new data from a specific time such as a time at which the information is received (e.g., a slot or symbol at which the information is received) or from a time passed by a specific offset from the specific time, or successfully receives/decodes the TB corresponding to the new data for a specific time duration, it may subtract the size of the TB from the packet size or the sum of the TB sizes acquired through the received information. Here, the TBs corresponding to the new data may mean different TBs distinguished by a combination of a HARQ process and a New Data Indicator (NDI).

Alternatively, considering a case where PDCCH detection fails, the BS may transmit size information about a sufficiently large packet or information on a sufficiently large sum of TB sizes to the UE. Upon successfully receiving/decoding TBs regardless of whether the data is new data or retransmitted data, the UE may subtract the size of the TBs from the packet size or the sum of TB sizes acquired through the received information. When the value acquired through the subtraction is a positive value or a non-negative value, the UE may continuously monitor the PDCCH in all or part of the CORESET and/or search space. When a DRX operation is configured, the PDCCH monitoring may be continued in a PDCCH monitoring occasion configured by the DRX operation.

When the value obtained through the subtraction is negative or 0, the UE may stop the PDCCH monitoring for all or part of the CORESET and/or search space. Alternatively, when the value obtained through the subtraction is negative or 0, the UE may not expect to receive all or part of PDSCH transmissions overlapped in terms of time. A common search space (CSS) may be excluded from the CORESET and/or search space in which the PDCCH monitoring is stopped. This may have an advantage in receiving a broadcast message.

In addition, since the time at which the UE stops the PDCCH monitoring must be a time at which determination of whether the PDSCH is successfully decoded is allowed, and accordingly it may be a time passed by a specific offset from the time at which reception of the corresponding PDSCH is completed, a time at which HARQ-ACK for the PDSCH is transmitted from the UE, or a time at which the BS receives HARQ-ACK for the PDSCH. The specific offset may be represented in units of slots and/or symbols. In addition, the power consumption mode of the UE (e.g., a normal access state or a power saving state) may be changed according to the relationship between the additional information about the packet received by the UE from the BS and the sum of TB sizes actually successfully received by the UE.

When the UE successfully receives/decodes a TB corresponding to new data from a specific time such as a time at which the information is received (e.g., a slot or symbol at which the information is received) or from a time passed by a specific offset from the specific time, or successfully receives/decodes the TB corresponding to the new data for a specific time duration, it may accumulate and store the size of the successfully received/decoded TB in a separate storage space. In this case, the operation of the UE may be configured differently between the case where the stored value is less than or equal to the packet size or the sum of TB sizes received from the BS, and the other cases.

For example, when the stored value is less than or equal to the packet size or the sum of TB sizes received from the BS, the UE may continue PDCCH monitoring. When the stored value is greater than or equal to the packet size or the sum of TB sizes received from the BS, the UE may stop the PDCCH monitoring.

Embodiment 2-1(b)

In Embodiment 2-1(b), a specific PDCCH monitoring method according to Embodiment 1-1(b) will be described.

According to Embodiment 1-1(b), when the UE receives information on the number of TBs, it may store a value included in the information in a separate storage space. When the UE successfully receives/decodes TBs corresponding to new data from a specific time such as a time at which the information is received (e.g., a slot or symbol at which the information is received) or from a time passed by a specific offset from the specific time, or successfully receives/decodes TBs corresponding to the new data for a specific time duration, it may subtract the number of the corresponding TBs from the number of TBs acquired through the received information. Here, the TBs corresponding to the new data may mean different TBs distinguished by a combination of a HARQ process and a New Data Indicator (NDI).

Alternatively, considering a case where PDCCH detection fails, the BS may transmit information about a sufficiently large number of TBs to the UE. Upon successfully receiving/decoding TBs regardless of whether the data is new data or retransmitted data, the UE may subtract the number of the TBs from the number of TBs acquired through the received information. When the value acquired through the subtraction is a positive value or a non-negative value, the UE may continuously monitor the PDCCH in all or part of the CORESET and/or search space. When a DRX operation is configured, the PDCCH monitoring may be continued in a PDCCH monitoring occasion configured by the DRX operation.

When the value obtained through the subtraction is negative or 0, the UE may stop the PDCCH monitoring for all or part of the CORESET and/or search space. Alternatively, when the value obtained through the subtraction is negative or 0, the UE may not expect to receive all or part of PDSCH transmissions overlapped in terms of time. A common search space (CSS) may be excluded from the CORESET and/or search space in which the PDCCH monitoring is stopped. This may have an advantage in receiving a broadcast message.

In addition, since the time at which the UE stops the PDCCH monitoring must be a time at which determination of whether the PDSCH is successfully decoded is allowed, and accordingly it may be a time passed by a specific offset from the time at which reception of the corresponding PDSCH is completed, a time at which HARQ-ACK for the PDSCH is transmitted from the UE, or a time at which the BS receives HARQ-ACK for the PDSCH. The specific offset may be represented in units of slots and/or symbols. In addition, the power consumption mode of the UE (e.g., a normal access state or a power saving state) may be changed according to the relationship between the additional information about the packet received by the UE from the BS and the number of TBs actually successfully received by the UE.

When the UE successfully receives/decodes TBs corresponding to new data from a specific time such as a time at which the information is received (e.g., a slot or symbol at which the information is received) or from a time passed by a specific offset from the specific time, or successfully receives/decodes the TBs corresponding to the new data for a specific time duration, it may accumulate and store the number of the successfully received/decoded TB in a separate storage space. In this case, the operation of the UE may be configured differently between the case where the stored value is less than or equal to the packet size or the sum of TB sizes received from the BS, and the other cases.

For example, when the stored value is less than or equal to the number of TBs received from the BS, the UE may continue PDCCH monitoring. When the stored value is greater than or equal to the number of TBs received from the BS, the UE may stop the PDCCH monitoring.

Embodiment 2-1(c)

In Embodiment 2-1(c), a specific PDCCH monitoring method according to Embodiment 1-1(c) will be described.

According to Embodiment 1-1(c), when the UE receives information on the number of PDCCHs and/or PDSCHs, it may store a value included in the information in a separate storage space. When the UE successfully receives/decodes all or some TBs transmitted on a PDSCH from a specific time point such as a time at which the information is received (e.g., a slot or symbol at which the information is received) or from a time passed by a specific offset from the specific time, or successfully receives/decodes all or some TBs transmitted on the PDSCH for a specific time duration, it may subtract the number of corresponding PDCCHs and/or PDSCHs from the number of PDCCHs and/or PDSCHs acquired through the received information.

Alternatively, in consideration of latency, the BS may transmit information about a sufficiently large number of PDCCHs and/or PDSCHs to the UE. Upon receiving the PDCCHs and/or PDSCHs regardless of whether the PDSCH decoding is successfully performed, the UE may subtract the number of the PDCCHs and/or PDSCHs from the number of PDCCHs and/or PDSCHs acquired through the received information.

When the value acquired through the subtraction is a positive value or a non-negative value, the UE may continuously monitor the PDCCH in all or part of the CORESET and/or search space. When a DRX operation is configured, the PDCCH monitoring may be continued in a PDCCH monitoring occasion configured by the DRX operation.

When the value obtained through the subtraction is negative or 0, the UE may stop the PDCCH monitoring for all or part of the CORESET and/or search space. Alternatively, when the value obtained through the subtraction is negative or 0, the UE may not expect to receive all or part of PDSCH transmissions overlapped in terms of time. A common search space (CSS) may be excluded from the CORESET and/or search space in which the PDCCH monitoring is stopped. This may have an advantage in receiving a broadcast message.

In addition, since the time at which the UE stops the PDCCH monitoring must be a time at which determination of whether the PDSCH is successfully decoded is allowed, and accordingly it may be a time passed by a specific offset from the time at which reception of the corresponding PDSCH is completed, a time at which HARQ-ACK for the PDSCH is transmitted from the UE, or a time at which the BS receives HARQ-ACK for the PDSCH. The specific offset may be represented in units of slots and/or symbols. In addition, the power consumption mode of the UE (e.g., a normal access state or a power saving state) may be changed according to the relationship between the information received by the UE from the BS and the number of PDCCHs and/or PDSCHs actually successfully received by the UE.

When the UE receives PDCCHs and/or PDSCHs from a specific time such as a time at which the information is received (e.g., a slot or symbol at which the information is received) or from a time passed by a specific offset from the specific time, or receives PDCCHs and/or PDSCHs for a specific time duration, it may accumulate and store the number of the PDCCHs and/or PDSCHs in a separate storage space. In this case, the operation of the UE may be configured differently between the case where the stored value is less than or equal to the total number of the number of PDCCHs and/or PDSCHs received from the BS and the other cases.

For example, when the stored value is less than or equal to the total number of PDCCHs and/or PDSCHs received from the BS, the UE may continue PDCCH monitoring. When the stored value is greater than or equal to the total number of PDCCHs and/or PDSCHs received from the BS, the UE may stop the PDCCH monitoring.

Embodiment 2-1(d)

In Embodiment 2-1(d), a specific PDCCH monitoring method according to Embodiment 1-1(d) will be described.

Upon receiving information on an active duration T for which the UE may receive data according to Embodiment 1-1(d), the UE may continuously monitor the PDCCH in all or part of the CORESET and/or search space from the time at which the information is received or from a time passed by a specific offset from the time. When a DRX operation is configured, the PDCCH monitoring may be continued in a PDCCH monitoring occasion configured by the DRX operation.

In other words, at a time other than the active duration, the UE may stop PDCCH monitoring for all or part of the CORESET and/or search space. Alternatively, the UE may not expect to receive all or part of PDSCH transmissions overlapped in terms of time at a time other than the active duration. A CSS may be excluded from the CORESET and/or search space in which the PDCCH monitoring is stopped. This may have an advantage in receiving a broadcast message.

In Embodiments 2-1(a) to 2-1(d), the BS may transmit packet information about a PDSCH scheduled based on DCI and packet information about a PDSCH corresponding to DL semi-persistent scheduling (SPS) to the UE independently. In this case, a release signal for the DL SPS may not be received.

In addition, the BS may transmit only additional information about a packet of the PDSCH scheduled based on DCI to the UE. This is because the DL SPS may be a packet for Voice over Internet Protocol (VoIP), and thus individually managing multiple packets may be useful in terms of network resource management or TB management of the UE.

While scheduling a specific packet for a specific UE or before completing the scheduling, the BS may additionally schedule a new packet or there may be a change in the amount of the packet being transmitted. In this case, the BS may provide additional information about the updated packet to the UE again, or may transmit, to the UE, additional information about the details of the change of the additional information about the packet, for example, information about reduction/increase/maintenance of the packet. In addition, the UE may determine a PDCCH monitoring method based on the additional information about the packet updated or transmitted by the BS.

When the BS transmits the additional information about the updated packet to the UE, the UE may perform PDCCH monitoring based on the additional information about the most recently received packet, that is, the last received packet in the additional information about a plurality of packets received from the BS. In addition, the UE may receive a specific signal or channel enabling the UE to continue PDCCH monitoring for all or part of the CORESET and/or search space from the BS. In this case, the UE continue the PDCCH monitoring for a duration predetermined or configured through a higher layer.

Even when the PDCCH monitoring needs to be stopped, PDCCH monitoring at a specific point in time for receiving a broadcast message may be limitedly performed. For example, PDCCH monitoring for fallback DCI such as DCI format 1-0/0-0 in a specific common search space (CSS) may still be performed. The PDCCH monitoring at a specific point in time for receiving the broadcast message may be intended for PDCCH CRC masking and/or PDSCH data scrambling to monitor a PDCCH based on the SI-RNTI, P-RNTI, RA-RNTI, or TC-RNTI.

In addition to or independently from the operation of attempting power saving based on the additional information about the packet, the UE may perform the BWP switching operation based on the additional information about the packet. For example, when the UE receives TB scheduling that satisfies the packet size or TB size received from the BS and/or decoding of the TB is successful performed, the UE may switch the active BWP to a default BWP or a third BWP configured for the purpose power saving after a certain point in time from the corresponding time.

Thus, the UE having successfully received the packet may save power by reducing the size of the active BWP until receiving new information on the packet. A time at which BWP switching starts may be after a specific offset from the last slot or the last symbol at which the PDSCH for the packet is transmitted. Here, the specific offset may be represented in units of slots and/or symbols. A specific example of the specific offset may be a processing time corresponding to the PDSCH, a time when a HARQ-ACK for the PDSCH is transmitted from the UE, or a time when the BS receives a HARQ-ACK for the PDSCH.

The UE may receive a PDSCH through a single serving cell, or may receive a PDSCH from a plurality of serving cells based on carrier aggregation (CA). At this time, additional information about the packet may be transmitted to the UE as a value for all serving cells. The UE may configure a PDCCH monitoring method and/or an active BWP after comparing the information on the packet with the PDCCH, PDSCH and/or TB scheduled from the plurality of serving cells. In addition, the UE may receive additional information about a packet for each serving cell or each serving cell group. In this case, the additional information for the packet and the UE, a PDCCH monitoring method based on the PDCCH, PDSCH and/or TB received by the UE, and/or an active BWP may be configured differently for each serving cell or each serving cell group.

Embodiments 2-2(a) to 2-2(d) described below are embodiments of the UE operation according to the method by which additional information about a packet is transmitted from the BS to the UE (Embodiments 1-2(a) to 1-2(d)).

Embodiment 2-2(a)

As in Embodiment 1-2(a), the UE may receive additional information about a packet through DCI included in the PDCCH. In this case, the DCI may be configured to have the same size as fallback DCI such as DCI format 1-0, or the payload size may be configured through a higher layer. The CRC of the DCI may be masked with a third RNTI.

The UE may monitor the PDCCH based on additional information about a packet corresponding to the UE in the additional information about packets for a plurality of UEs received through a higher layer. The UE may perform the PDCCH monitoring based on the additional information about the packet for a time duration from the first symbol or last symbol of a PDCCH monitoring occasion in which the PDCCH is transmitted to the first symbol or last symbol of a PDCCH monitoring occasion included in the next period. A specific offset represented in units of slots and/or symbols may be additionally applied in the time duration in consideration of the PDCCH/PDSCH decoding time. On the other hand, only the start time of the PDCCH monitoring may be defined, and the end time thereof may not be defined separately. This is intended to efficiently update the additional information about the packet based on a PDCCH monitoring periodicity.

Embodiment 2-2(b)

As mentioned in Embodiment 1-2(b), when receiving paging information such as a paging record, the UE may receive additional information about a packet. For example, the paging information may carry, to the UE, additional information about the packet of the UE together with the information about the identity of the UE. The paging information may be distinguished from the existing paging information. For example, the paging information including the additional information about the packet may be defined as an extended paging record. In this case, the existing paging record and the extended paging record may be distinguished by a paging occasion or may be distinguished based on PDCCH CRC masking and/or PDSCH data scrambling through a separate eP-RNTI.

Upon receiving the paging PDCCH or the paging PDSCH as described above, the UE may monitor the PDCCH based on the additional information about the packet. In this case, the UE may monitor the PDCCH based on the additional information about the packet for a time duration from the first symbol or last symbol of the corresponding PDCCH monitoring occasion to the first symbol or last symbol of a PDCCH monitoring occasion in the next period. A specific offset represented in units of slots and/or symbols may be additionally applied in the time duration in consideration of the PDCCH/PDSCH decoding time. On the other hand, only the start time of the PDCCH monitoring may be defined, and the end time thereof may not be defined separately.

Embodiment 2-2(c)

As mentioned in Embodiment 1-2(c), additional information about a packet may be transmitted to the UE through a medium access control (MAC) message. The MAC message may be transmitted on the PDSCH, and CRC masking and/or PDSCH data scrambling of the PDCCH corresponding to the MAC message of the UE may be distinguished through a UE ID such as C-RNTI, CS-RNTI or MCS-C-RNTI. The UE receiving the PDSCH including the MAC message may monitor the PDCCH based on additional information about the packet. For example, based on the additional information about the packet, the UE may start monitoring the PDCCH at a slot and/or symbol following a specific offset expressed in units of slots and/or symbols from the slot in which the PDSCH is transmitted or the last symbol in which the PDSCH is transmitted. Here, the MAC message may be included in another MAC message or may be transmitted together with another MAC message simultaneously. For example, the MAC message may be included in a TCI update MAC message.

Embodiment 2-2(d)

As mentioned in Embodiment 1-2(d), packet information up to the next wake-up signal transmission may be transmitted through a wake-up signal, or the wake-up signal may contain the packet information when necessary. Alternatively, the packet information may be used as a wake-up signal. For example, when the UE receives a wake-up signal in an active state, it may be assumed that the wake-up signal contains additional information about the packet or assistance information such as additional information.

When the wake-up signal is transmitted for the purpose of wake-up, additional information and/or additional information about the packet may be transmitted together to determine whether to monitor the control channel of the UE. Here, the wake-up signal may be replaced with a go-to-sleep signal, and in this case, information further restricting PDCCH monitoring of the UE may be transmitted together.

The wake-up signal is a signal indicating whether the UE actually performs an operation for PDCCH monitoring for the active time corresponding to the wake-up signal. When the wake-up signal is not received, the UE may not perform the PDCCH monitoring operation.

In addition, when a go-to-sleep signal is received, the UE may not perform the PDCCH monitoring operation for the active time.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 13:
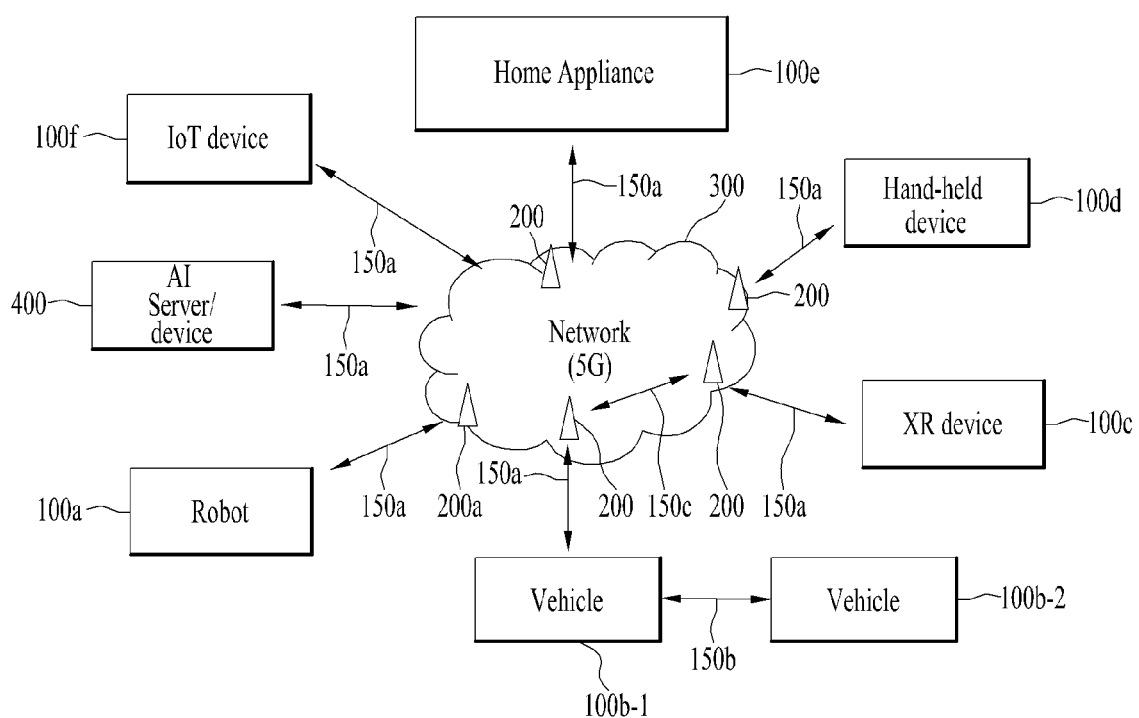
FIG. 13 shows an example wireless communication environment to which embodiments of the present disclosure are applicable.

FIG. 13 illustrates a communication system 1 applied to the present disclosure.

Referring to FIG. 13, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 14:
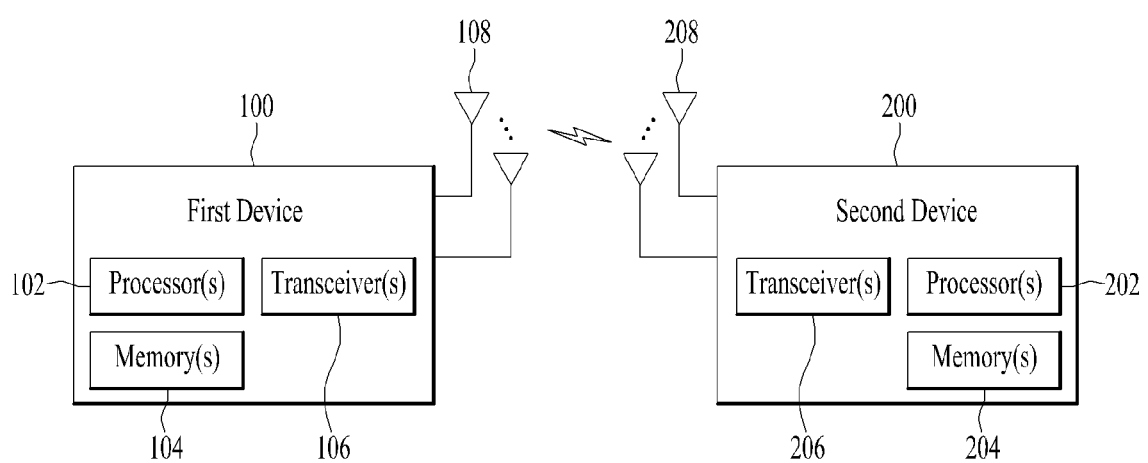
FIGS. 14 to 16 show examples of various wireless devices to which embodiments of the present disclosure are applied.

FIG. 14 illustrates wireless devices applicable to the present disclosure.

Figure 15:
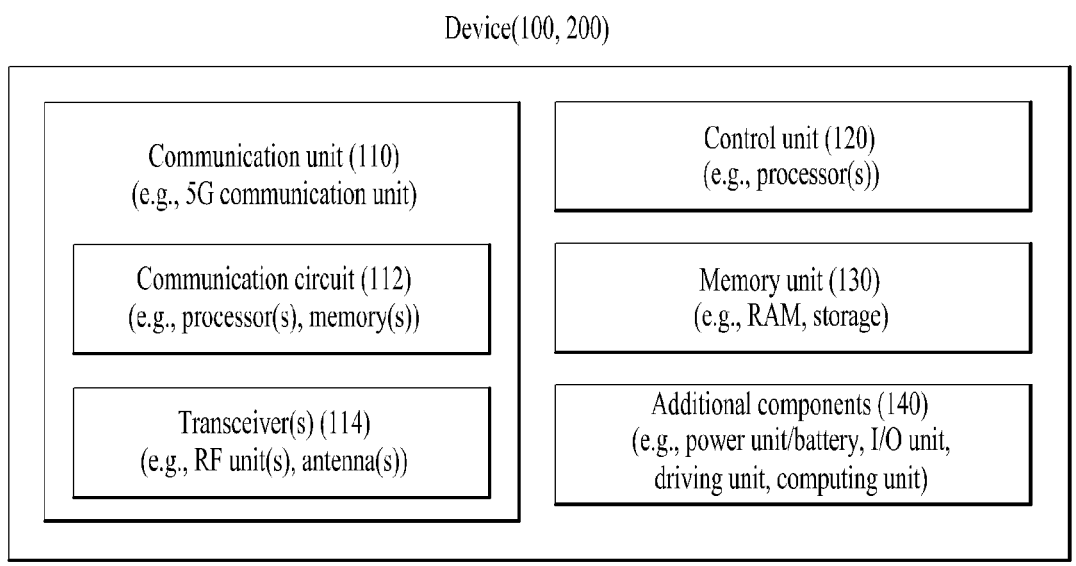

Referring to FIG. 14, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Specifically, commands and/or operations that are controlled by the processor 102 of the first wireless device 100 and stored in the memory 104 according to an embodiment of the present disclosure will be described.

Although the following operations will be described based on the control operation of the processor 102 from the perspective of the processor 102, software code or the like for performing these operations may be stored in the memory 104.

The processor 102 may control the transceiver 106 to receive additional information for reception of downlink data from the second wireless device 200. Here, the received additional information may be generated based on the amount and/or characteristics of downlink data to be transmitted by the BS, and specific details of the additional information may be determined based on Embodiments 1 and 2 described above.

The processor 102 may control the transceiver 106 to monitor the PDCCH based on the additional information and receive downlink data scheduled by the PDCCH. In this case, a specific operation of the processor 102 of receiving the downlink data may be performed based on Embodiments 1 and 2.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Specifically, commands and/or operations controlled by the processor 202 of the second wireless device 200 and stored in the memory 204 according to an embodiment of the present disclosure will be described.

Although the following operations will be described based on the control operation of the processor 202 from the perspective of the processor 202, software code or the like for performing these operations may be stored in the memory 204.

The processor 202 may generate additional information based on the amount and/or characteristics of downlink data to be transmitted to the first wireless device 100. The processor 202 may control the transceiver 206 to transmit the generated additional information to the first wireless device 100. Here, the generated additional information and a method for transmitting the additional information to the first wireless device 100 may be based on Embodiments 1 and 2 described above. The processor 202 may control the transceiver 206 to transmit a physical downlink control channel (PDCCH) for scheduling of the downlink data. In addition, it may control the transceiver 206 to transmit the downlink data to the first wireless device 100 based on the scheduling information included in the PDCCH. In this operation, the processor 202 may control the transceiver 206 to transmit the PDCCH and the downlink data to the first wireless device 100 based on the additional information. A specific transmission method and operation procedure may be based on Embodiments 1 and 2.

Hereinafter, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

FIG. 15 illustrates another example of a wireless device applied to the present disclosure. The wireless device may be implemented in various forms according to a use case/service (refer to FIG. 13).

Referring to FIG. 15, wireless devices 100 and 200 may correspond to the wireless devices 100 and 200 of FIG. 14 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110. Accordingly, the specific operation process of the control unit 120 and the program/code/command/information stored in the memory unit 130 according to the present disclosure may correspond to operation of at least one of the processors 102 and 202 and operation of at least of the memory 104 and 204 of FIG. 14.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 13), the vehicles (100b-1 and 100b-2 of FIG. 13), the XR device (100c of FIG. 13), the hand-held device (100d of FIG. 13), the home appliance (100e of FIG. 13), the IoT device (100f of FIG. 13), a digital broadcasting terminal, a hologram device, a public safety device, an MTC device, a medical device, a FinTech device (or a finance device), a security device, a climate/environment device, the AI server/device (400 of FIG. 13), the BSs (200 of FIG. 13), a network node, or the like. The wireless device may be mobile or fixed according to a use case/service.

In FIG. 15, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

The implementation example of FIG. 15 will hereinafter be described with reference to the attached drawings.

Figure 16:
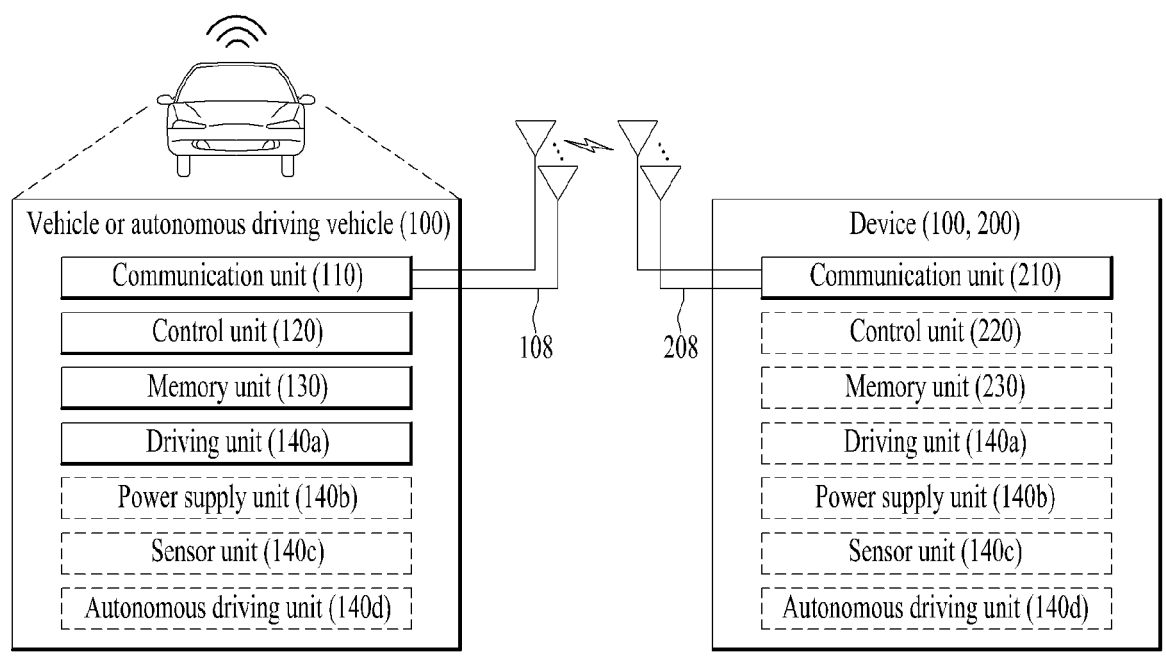

FIG. 16 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 16, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 15, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Figure 17:
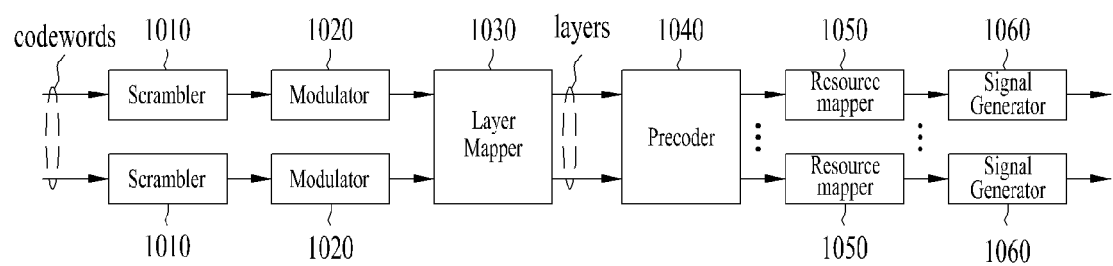
FIG. 17 shows an example signal processing circuit to which embodiments of the present disclosure are applied.

FIG. 17 illustrates a signal processing circuit for transmission (Tx) signals.

Referring to FIG. 17, the signal processing circuit 1000 may include a scrambler 1010, a modulator 1020, a layer mapper 1030, a precoder 1040, a resource mapper 1050, and a signal generator 1060. The operations/functions shown in FIG. 17 may be performed by the processors 102 and 202 and/or the transceivers 106 and 206 shown in FIG. 14. However, embodiments are not limited thereto. Hardware elements shown in FIG. 17 may be implemented by the processors 102 and 202 and/or the transceivers 106 and 206 shown in FIG. 14. For example, the blocks 1010 to 1060 may be implemented by the processors 102 and 202 shown in FIG. 14. In addition, the blocks 1010 to 1050 may be implemented by the processors 102 and 202 shown in FIG. 14, and the block 1060 may be implemented by the transceivers 106 and 206 shown in FIG. 14.

The codeword may be transformed into a radio signal (or a radio frequency (RF) signal) through the signal processing circuit 1000 shown in FIG. 17. Here, the codeword may be a coded bit sequence of an information block. The information block may include a transmission (Tx) block (e.g., UL-SCH transmission block, and/or DL-SCH transmission block). The radio signal may be transmitted through various physical channels (e.g., PUSCH, and PDSCH).

In more detail, the codeword may be converted into a bit sequence scrambled by the scrambler 1010. The scramble sequence used for such scrambling may be generated based on an initialization value, and the initialization value may include ID information of a wireless device, etc. The scrambled bit-sequence may be modulated into a modulated symbol sequence by the demodulator 1020. The modulation scheme may include pi/2-BPSK(pi/2-Binary Phase Shift Keying), m-PSK(m-Phase Shift Keying), m-QAM(m-Quadrature Amplitude Modulation), etc. The complex modulated symbol sequence may be mapped to one or more transmission (Tx) layers by the layer mapper 1030. Modulated symbols of the respective Tx layers may be mapped (precoded) to the corresponding antenna port(s) by the precoder 1040. The output value (z) of the precoder 1040 may be obtained by multiplying the output value (y) of the layer mapper 1030 by the (NxM) precoding matrix (W). In this case, N is the number of antenna ports, and M is the number of Tx layers. In this case, the precoder 1040 may perform precoding after transform precoding (e.g., DFT transform) is performed on the complex modulated symbols. In this case, the precoder 1040 may perform precoding without performing transform precoding.

The resource mapper 1050 may map the modulated symbols of the respective antenna ports to time-frequency resources. The time-frequency resources may include a plurality of symbols (e.g., CP-OFDMA symbol and DFT-s-OFDMA symbol) in the time domain, and may include a plurality of subcarriers in the frequency domain. The signal generator 1060 may generate radio signals from the mapped modulated symbols, and the generated radio signals may be transferred to other devices through the respective antennas. To this end, the signal generator 1060 may include an Inverse Fast Fourier Transform (IFFT) module, a Cyclic Prefix (CP) inserter, a Digital-to-Analog Converter (DAC), and a frequency uplink converter.

The signal processing steps for reception (Rx) signals in the wireless device may be arranged in the reverse order of the signal processing steps 1010 to 1060 shown in FIG. 17. For example, the wireless devices 100 and 200 (shown in FIG. 15) may receive radio signals from the outside through the antenna ports/transceivers. The received radio signals may be converted into a baseband signal through a signal restorer. To this end, the signal restorer may include a frequency downlink converter, an analog-to-digital converter (ADC), a CP remover, and a Fast Fourier Transform (FFT) module. Thereafter, the baseband signal may be restored to the codeword after passing through the resource demapper process, the postcoding process, the demodulation process, and the descrambling process. The codeword may be restored to an original information block through decoding. Therefore, the signal processing circuit (not shown) for Rx signals may include a signal restorer, a resource demapper, a postcoder, a demodulator, a descrambler, and a decoder.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although a method for transmitting and receiving a downlink data channel and an apparatus therefor have been described mainly focusing on examples thereof applied to the 5th generation NewRAT system, they may be applied to various wireless communication systems in addition to the 5th generation NewRAT system.

The invention claimed is:

1. A method for receiving downlink data by a user equipment (UE) in a wireless communication system, the method comprising:
   receiving information related to the downlink data transmitted during a specific time duration;
   receiving downlink control information (DCI) based on the information related to the downlink data; and
   receiving the downlink data based on the DCI,
   wherein the information related to the downlink data is information on an amount of the downlink data transmitted during the specific time duration,
   wherein the receiving of the DCI is receiving the DCI until downlink data corresponding to the amount of the downlink data is received.

2. The method of claim 1, wherein the UE is capable of communicating with at least one of anther UE, a network, a base station, or an autonomous driving vehicle.

3. An apparatus for receiving downlink data in a wireless communication system, the apparatus comprising:
   at least one processor; and
   at least one computer memory operably connectable to the at least one processor and storing instructions that, when executed by the at least one processor, perform operations comprising:
   receiving information related to the downlink data transmitted during a specific time duration;
   receiving downlink control information (DCI) based on the information related to the downlink data; and
   receiving the downlink data based on the DCI,
   wherein the information related to the downlink data is information on an amount of the downlink data transmitted during the specific time duration,
   wherein the receiving of the DCI is receiving the DCI until downlink data corresponding to the amount of the downlink data is received.

4. The apparatus of claim 3, wherein the apparatus is capable of communicating with at least one of a user equipment (UE), a network, a base station, or an autonomous driving vehicle.

5. A user equipment (UE) for receiving downlink data in a wireless communication system, the UE comprising:
   at least one transceiver;
   at least one processor; and
   at least one computer memory operably connectable to the at least one processor and storing instructions that, when executed by the at least one processor, perform operations comprising:
   receiving, via the at least one transceiver, information related to the downlink data transmitted during a specific time duration,
   receiving, via the at least one transceiver, downlink control information (DCI) based on the information related to the downlink data,
   receiving, via the at least one transceiver, the downlink data based on the DCI,
   wherein the information related to the downlink data is information on an amount of the downlink data transmitted during the specific time duration,
   wherein the receiving of the DCI is receiving the DCI until downlink data corresponding to the amount of the downlink data is received.

\* \* \* \* \*